Dec. 14, 1971 H. D. COE, JR 3,626,704

THERMOELECTRIC UNIT

Filed Jan. 9, 1970 2 Sheets-Sheet 1

Dec. 14, 1971 H. D. COE, JR 3,626,704

THERMOELECTRIC UNIT

Filed Jan. 9, 1970 2 Sheets-Sheet 2

WITNESSES

INVENTOR
Harry D. Coe, Jr.
BY
ATTORNEY

United States Patent Office 3,626,704

Patented Dec. 14, 1971

3,626,704

THERMOELECTRIC UNIT

Harry D. Coe, Jr., Murrysville, Pa., assignor to Westinghouse Electric Corporation, Pittsburgh, Pa.

Filed Jan. 9, 1970, Ser. No. 1,613

Int. Cl. F25b *21/02*

U.S. Cl. 62—3 7 Claims

ABSTRACT OF THE DISCLOSURE

The invention relates in general to thermoelectric units and more particularly to a thermoelectric unit which includes a plurality of coextensive symmetrically arranged elongated columns, wherein each column is formed from an alternate arrangement of heat exchange means and thermoelectric material. Means are provided for exerting a compressive force through the length of each column and for exerting lateral support between columns.

BACKGROUND OF THE INVENTION

This invention pertains to thermoelectric heat transfer devices, and more particularly to a new lightweight, compact structure for said thermoelectric devices.

In accordance with the present state of the art, materials which are practically useful as thermoelectric cooling couples are very weak and brittle in comparison with most normal materials of construction. Early devices using these materials protected them with heavy structural support members which kept the thermoelectric pellets and their connection to other parts of the device in compression under all conditions of service. In later applications, weight and space requirements precluded this approach. While light compact designs were achieved, under some severe service conditions, the reliability was less than older designs.

The problems mentioned are more prevalent in those cases where at least one of the heat transfer mediums is gas. This is because larger heat transfer surfaces are required where at least one of the heat transfer mediums is gas than would be required if the heat transfer mediums were liquids. Here, the ratio of heat transfer area to pellet area is large. Thus, because of these relatively large heat transfer surfaces the distance between pellets relative to the size of the pellets becomes large and the stiffness of the heat transfer surface becomes low in relation to the pellet stiffness. With larger pellet areas and small heat transfer members, a simple thin outer structural casing can compress the pellets, but as heat transfer surfaces become larger and less stiff, the outer casing quickly outweighs the active components. Thus in prior designs of lightweight, compact structures, the advantage of a compression load on the pellets was sacrificed.

Since an important contribution to the increasing weight of a thermoelectric module has been from the structure required to spread the constraining force from outside the heat transfer surface to the pellet, the obvious answer is to stack more pellets between these members. However, due to the small area of the pellets the number that can be stacked has been seriously limited in the past by buckling of the column.

It is accordingly among the objects of this invention to provide a compressive pellet load with a light compact structure together with adequate lateral support to prevent buckling under severe service conditions.

SUMMARY OF THE INVENTION

The aforementioned requirements are met by a thermoelectric unit comprising a plurality of symmetrically arranged coextensive columns. Each column comprises a plurality of tandemly arranged heat exchangers formed from electrically and thermally conductive material. Each of the heat exchangers has a pair of opposed sides, with layers of thermoelectric material positioned between adjacent heat exchangers and secured to the adjacent sides of the respective heat exchangers. The polarity of the thermoelectric layers are selected so as to produce alternate thermoelectric cooling and heating throughout the tandem configuration of heat exchangers within the columns.

The effective radius of gyration of each column, in such a configuration (the radius of gyration being the radius of a cylindrical surface coaxial with the axis of rotation or oscillation of the column such that if the entire mass of the column were concentrated in that surface the moment of inertia and energy of rotation would be unchanged), would be proportional to the thermoelectric pellet area, which is the smallest area of lateral support within each column. Such relatively small pellet areas would normally render the columns readily susceptible to buckling.

Therefore adequate lateral supports are provided between corresponding heat exchangers on adjacent columns so that the effective radius of gyration of the column becomes proportional to the pellet spacing rather than the pellet area. This increase in lateral support adds sufficient stability to prevent buckling. A single tension member positioned generally in the center of this columnar array (or other form of member concentric with the center), and two force spreaders, one at either end, provide a compressive force throughout the length of each column.

It is the use of multiple columns with lateral supports and/or a multiple column array with a central tension member that provides a compressive force throughout each column, which distinguishes this invention from earlier attempts to stack pellets in columns, and provides the complete basic structure at a weight which is quite small relative to the weight of the active components.

DESCRIPTION OF THE DRAWINGS

For a better understanding of this invention reference may be had to the accompanying drawings, in which.

DESCRIPTION OF THE PREFERRED EMBODIMENT

Figure 1:
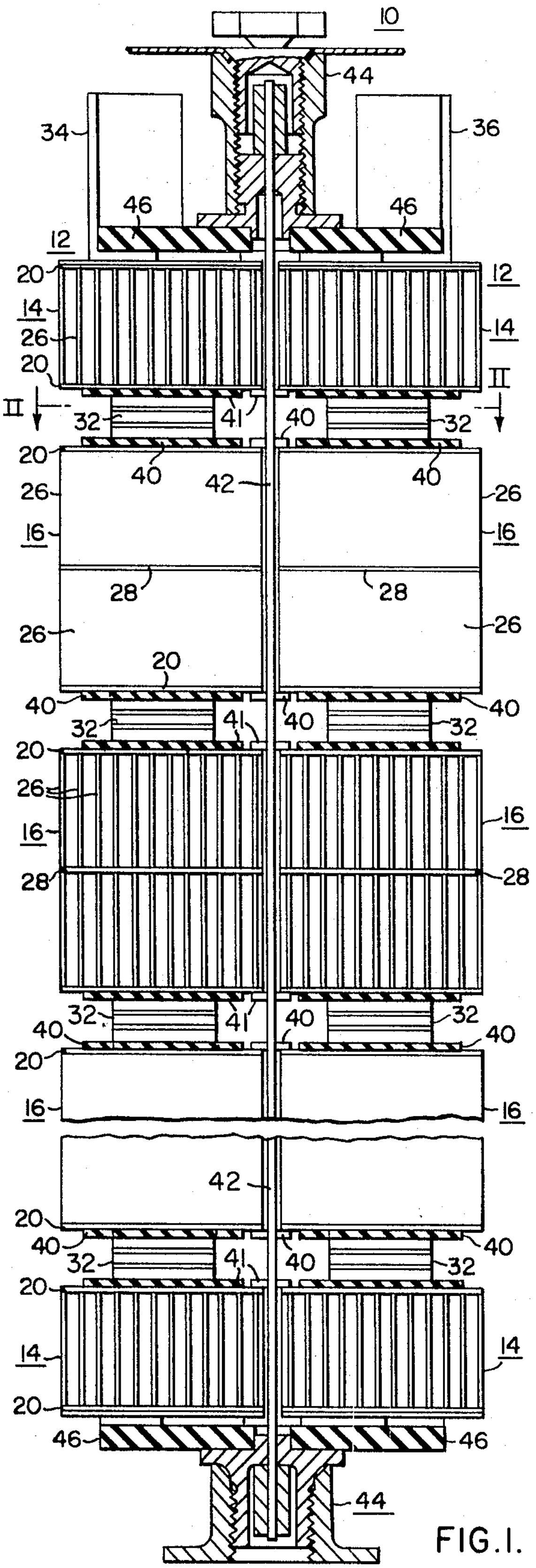
FIG. 1 is a longitudinal sectional view of an air to air thermoelectric heat exchange unit embodying the principles of this invention taken along the lines I—I of FIG 2.
Figure 2:
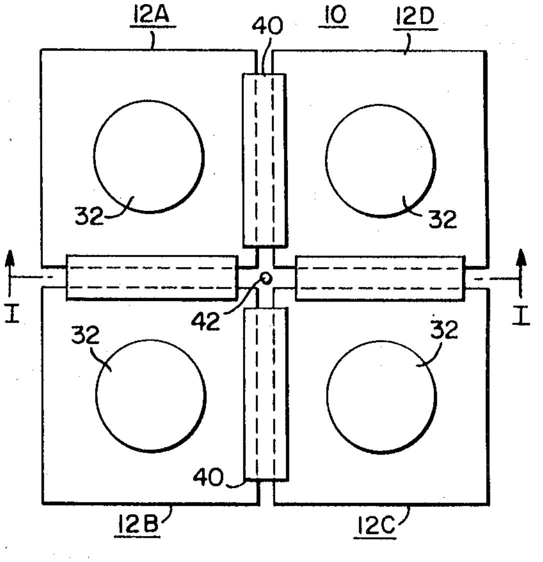
FIG. 2 is a cross-sectional view taken along line II—II of FIG. 1.

Referring now to the embodiment of this invention illustrated in FIGS. 1 and 2, there is shown a thermopile 10 constructed in accordance with the principles of this invention, comprising a plurality of symmetrically arranged coextensive columns 12. Each column comprises a plurality of tandemly arranged heat exchangers 14 and 16. Each of said heat exchangers includes a pair of opposed sides 20, respectively, formed from an electrically and thermally conductive material such as copper or aluminum and a plurality of transversely extending fins 26, desirably formed from the same electrically and thermally conductive material as sides 20, and which are secured to, and extend between the pair of sides 20 of each heat exchanger 14 or 16. As will be appreciated from FIG. 1, the end heat exchangers 14 of each column 12 are smaller than the intermediate heat exchangers 16 and as illustrated, heat exchangers 16 are formed from two heat exchangers 14, which are joined together at their sides to form central partition 28, by suitable means, as by brazing, to produce an electrically conductive joint therebetween. The fins 26 of alternate heat exchangers 16 of columns 12 are located in planes perpendicular to the planes of the fins 26 of adjacent heat exchangers 16. It will be appreciated, however, that the fins 26 of alternate heat exchangers 16 of column 12 may also be positioned in planes parallel to the plane of the fins 26 of adjacent heat exchanger 16 depending on their intended use in a parallel, counterflow or cross flow arrangement.

Figure 3:
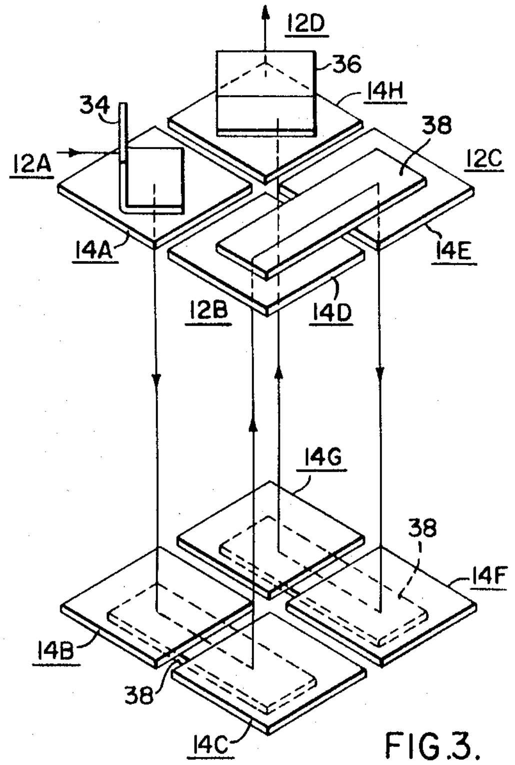
FIG. 3 is a schematic view of the electrical flow path through the thermoelectric heat exchange unit of FIGS. 1 and 2.

Layers of suitable thermoelectric material 32, such as bismuth telluride and selenium telluride, are positioned between adjacent heat exchange means 14 or 16, as the case may be, and are secured to the adjacent sides thereof, respectively, by suitable means, such as by brazing or soldering. Each of the layers of thermoelectric material 32 is formed from either thermoelectrically positive or thermoelectrically negative material. The polarities of said thermoelectric material being selected to form a current flow path within each column 12 of thermopile 10, having thermoelectrically positive and thermoelectrically negative material therein in an alternating sequence. Accordingly, as current passes from thermoelectrically positive material to thermoelectrically negative material, heat is imparted to the heat exchange means or junction member intermediate the positive and negative materials. Similarly as current passes from thermoelectrically negative to thermoelectrically positive material, a cooling effect takes place in the heat exchange means between such thermoelectric layers. As illustrated in FIG. 3, the current flow path in thermopile 10 commences in electrical terminal 34 which is connected by electrical conducting means to the upper side of heat exchanger 14A (each of the heat exchangers 14 being illustrated schematically in FIG. 3) and flows through column 12A to heat exchanger 14B as shown. Heat exchanger 14B is connected electrically to heat exchanger 14C by an electrically conducting strap 38. The current continues to flow upwardly through column 12B to heat exchanger 14D, the latter being connected by another electrically conducting strap 38 to heat exchanger 14E. The electrical flow path then continues down through column 12C to heat exchanger 14F which is connected by an electrically conducting strap 38 to heat exchanger 14G. The current flow path through thermopile 10 then continues up through column 12D terminating in electrical terminal 36 which is electrically coupled to heat exchanger 14H. The columns 12 are maintained in an electrically insulated relationship with one another so as to prevent shorting of the electrical current path.

As seen in FIGS. 1 and 2, electrically insulated lateral supports 40 for example a glass impregnated resin such as glass melamed sheets, are mounted to and extend between the corresponding upper and lower sides 20 of alternate corresponding heat exchangers 16 of adjacent columns 12. These rigid lateral supports 40 fixedly positioned between corresponding heat exchangers of adjacent columns 12 provide resistance to buckling of columns 12 and also serve to seal the heat transfer ducts between corresponding heat exchangers on adjacent columns 12. Electrically insulated elastic connections 41, such as rubber, may be positioned between the remaining corresponding heat exchanger of adjacent columns 12 so as to seal the heat transfer ducts between the remaining corresponding heat exchangers of adjacent columns 12 without interfering with the free movement of the columns 12 relative to each other. It will also be appreciated that the rigid lateral supports may be used to seal one side of a heat transfer duct while the elastic connections may be used to seal another side of the same heat transfer duct.

As seen in FIGS. 1 and 2 an elongated wire 42, maintained in an insulated relationship with columns 12 or formed from an insulating or low conductivity material such as titanium, stretched and under tension, passes through the center of the array of columns 12 and is secured at each end of thermopile 10 to adjustable tension mountings 44. Force spreaders 46 form the base of the adjustable tension mountings 44 and transfer a compressive force through the entire length of each of the columns 12.

In the example of the invention illustrated herein, the heat exchange structures 16 have the central partition 28 which provides additional rigidity to the heat exchangers 16, particularly since the latter heat exchangers are subjected to compressive forces by the force spreader 46 and the tension wire 42. It will be appreciated, however, that the fins 26 can extend directly between juxtaposed sides 20, respectively, without the use of the partitions 28.

Figure 4:
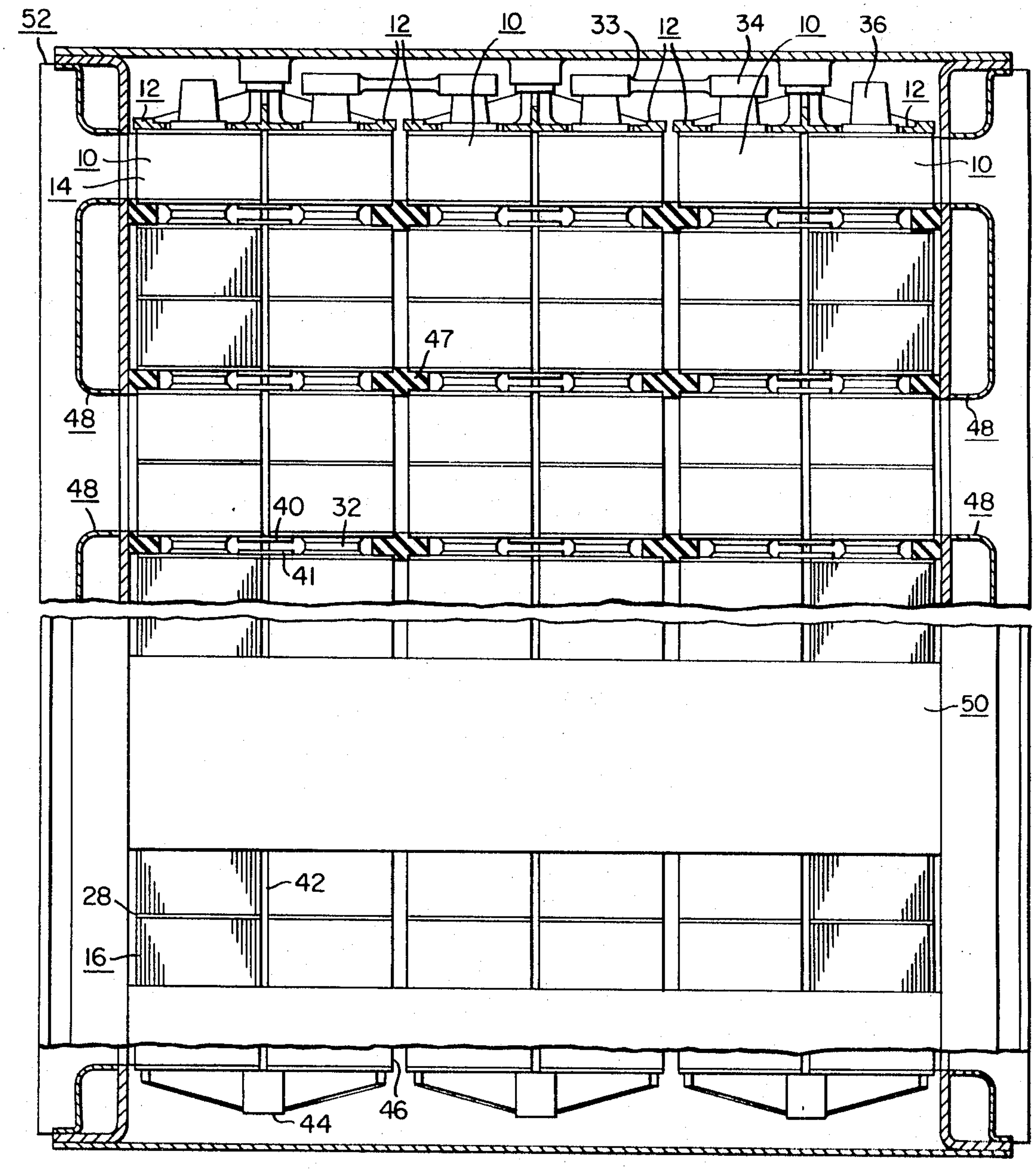
FIG. 4 is a longitudinal sectional view of an array of thermoelectric heat exchange units (of FIGS. 1 and 2) connected in series.

Referring now to the embodiment of this invention illustrated in FIG. 4, it will be appreciated that the Fig. 4 arrangement provides a series array of a plurality of thermopiles 10 illustrated in detail in FIG. 1. The thermopiles 10 are serially connected by electrically conducting straps 33 and separated by electrically insulated spacers 47. Air duct means 48 directs the air flow serially through the cold side heat exchangers within the columns 12. Similar air duct means 50 are provided for directing the air serially through the hot side heat exchangers. A housing 52 is shown surrounding the series away, however, this is not a requirement of this invention. In the event thermopile 10 is utilized as an electrical generator, of the thermoelectric type, air at different temperatures is selectively passed through heat exchangers 14 and 16 and thermoelectrically induced power is provided at terminal plates 34 and 36 by thermopile 10.

It will be appreciated by those skilled in the art that many modifications may be made to the embodiment of the invention illustrated herein without departing from the broad spirit and scope thereof. For example, although the illustrative embodiment discloses an air to air heat transfer device, it will be appreciated by those skilled in the art that the present embodiment may be adapted to liquid to air and liquid to liquid heat transfer devices. Similarly within the contemplation of this invention is the provision of a thermoelectric device for dehumidification applications. Accordingly, it is specifically intended that the embodiments of this invention, described in detail herein, be interpreted as illustrative rather than as limitative thereof.

I claim as my invention:

1. A thermoelectric unit comprising a plurality of spaced symmetrically arranged coextensive columns, each column comprising a plurality of tandemly arranged heat exchange means formed from electrically and thermally conductive material, each of said heat exchange means having a pair of opposed sides, layers of thermoelectric material positioned between adjacent heat exchange means and secured to the adjacent sides of said heat exchange means, respectively, the polarity of said thermoelectric layers being such as to produce alternate thermoelectric cooling and heating in the heat exchange means, respectively, end support means positioned at the top and bottom of said thermoelectric unit, means for holding said columns in compression, said means comprising a tension means positioned generally centrally of said thermoelectric unit and extending laterally between and secured to said end support means so as to exert a compressive force on said columns, and terminal means for forming a current path through said columns.

2. The thermoelectric unit of claim 1 wherein said tension means comprises a wire under tension.

3. The thermoelectric unit of claim 1 including means for adjusting the tension in said tension means.

4. The thermoelectric unit of claim 1, including electrically insulated rigid means for providing lateral support for at least every other of said heat exchange means within said column and electrically insulated elastic means for connecting the remainder of said heat exchange means, said elastic means and rigid means being secured to and extending between corresponding heat exchange means on adjacent columns.

5. The thermoelectric unit of claim 1 including electrically insulated rigid means for providing lateral support for at least one of said heat exchange means within said column, said rigid means being secured to, and extending between corresponding heat exchange means on adjacent columns.

6. The thermoelectric unit of claim 1 including rigid electrically insulated means for providing lateral support for at least every other of said heat exchange means within said column, said rigid means being secured to, and extending between corresponding heat exchange means on adjacent columns.

7. The thermoelectric unit of claim 1 including electrically insulated elastic means for providing elastic lateral support for at least one of said heat exchange means within said column, said elastic means being secured to, and extending between corresponding heat exchange means on adjacent columns.

References Cited

UNITED STATES PATENTS

| | | | |
|---|---|---|---|
| 3,213,630 | 10/1965 | Mole | 62—3 |
| 3,266,258 | 8/1966 | Rosenfeld | 62—3 |
| 3,273,347 | 9/1966 | Elfving | 62—3 |
| 3,290,177 | 12/1966 | Mole | 62—3 |
| 3,360,942 | 1/1968 | Elfving | 62—3 |
| 3,474,632 | 10/1969 | Newton | 62—3 |

WILLIAM D. WYE, Primary Examiner